United States Patent
Matsumoto et al.

(10) Patent No.: US 10,752,775 B2
(45) Date of Patent: Aug. 25, 2020

(54) SILICONE COMPOSITION AND CURED PRODUCT

(71) Applicants: SHIN-ETSU CHEMICAL CO., LTD., Tokyo (JP); TOYOTA JIDOSHA KABUSHIKI KAISHA, Toyota-shi, Aichi-ken (JP); SOKEN, INC., Nishio, Aichi (JP)

(72) Inventors: Nobuaki Matsumoto, Annaka (JP); Akira Sakamoto, Annaka (JP); Naomi Goto, Nagakute (JP); Masahiko Ishii, Nagakute (JP); Hiroaki Takeuchi, Toyota (JP); Yushi Suzuki, Toyota (JP); Shinji Miyoshi, Nishio (JP)

(73) Assignees: SHIN-ETSU CHEMICAL CO., LTD., Tokyo (JP); TOYOTA JIDOSHA KABUSHIKI KAISHA, Toyota-Shi (JP); SOKEN, INC., Nishio (JP)

(*) Notice: Subject to any disclaimer, the term of this patent is extended or adjusted under 35 U.S.C. 154(b) by 225 days.

(21) Appl. No.: 15/855,654

(22) Filed: Dec. 27, 2017

(65) Prior Publication Data
US 2018/0179384 A1 Jun. 28, 2018

(30) Foreign Application Priority Data
Dec. 28, 2016 (JP) .................. 2016-254833

(51) Int. Cl.
*C08L 83/04* (2006.01)
*C08G 77/18* (2006.01)
*C08G 77/12* (2006.01)
*C08G 77/20* (2006.01)

(52) U.S. Cl.
CPC .......... *C08L 83/04* (2013.01); *C08G 77/12* (2013.01); *C08G 77/18* (2013.01); *C08G 77/20* (2013.01)

(58) Field of Classification Search
None
See application file for complete search history.

(56) References Cited

U.S. PATENT DOCUMENTS

| | | | | |
|---|---|---|---|---|
| 5,194,649 A * | 3/1993 | Okawa | .......... | C07F 7/0896 556/451 |
| 7,153,583 B2 * | 12/2006 | Azechi | .......... | C08L 83/04 428/447 |
| 7,547,743 B2 * | 6/2009 | Goto | .......... | C08L 83/04 524/404 |
| 8,334,054 B2 * | 12/2012 | Endo | .......... | C09D 183/04 428/447 |
| 9,074,101 B2 * | 7/2015 | Tsubokawa | .......... | B82Y 30/00 |
| 9,520,612 B2 | 12/2016 | Sato et al. | | |
| 2003/0049466 A1 * | 3/2003 | Yamada | .......... | C08K 3/08 428/447 |
| 2007/0042533 A1 * | 2/2007 | Endo | .......... | C10M 169/04 438/118 |
| 2008/0213578 A1 * | 9/2008 | Endo | .......... | C08L 83/00 428/334 |
| 2009/0230348 A1 * | 9/2009 | Fukui | .......... | C08L 83/00 252/78.3 |
| 2011/0024675 A1 * | 2/2011 | Endo | .......... | C09D 183/04 252/78.3 |
| 2011/0188213 A1 * | 8/2011 | Domae | .......... | C08L 83/04 361/748 |
| 2012/0119137 A1 * | 5/2012 | Tsuji | .......... | C09K 5/14 252/78.3 |

(Continued)

FOREIGN PATENT DOCUMENTS

EP   3 062 378 A1   8/2016
JP   3867898 B2     1/2007

(Continued)

*Primary Examiner* — Robert S Loewe
(74) *Attorney, Agent, or Firm* — Birch, Stewart, Kolasch & Birch, LLP

(57) ABSTRACT

A silicone composition is provided comprising (A) an alkenyl-containing organopolysiloxane having a viscosity of 1.0-100 Pa·s at 25° C., (B) an organopolysiloxane of formula (1), (C) an organohydrogenpolysiloxane of formula (2), (D) an organohydrogenpolysiloxane of formula (3), (E) a filler, (F) a platinum group metal catalyst, and (G) a reaction inhibitor. The composition has a low viscosity and good moldability prior to curing and cures into a dilatant product that exhibits a low storage elastic modulus at a low strain rate and a high storage elastic modulus at a high strain rate.

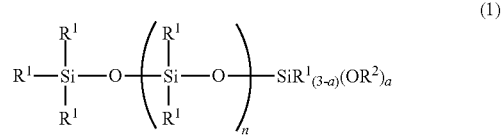

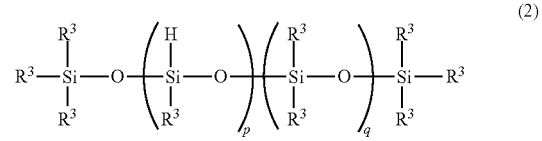

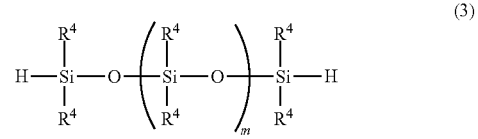

7 Claims, No Drawings

(56) References Cited

U.S. PATENT DOCUMENTS

| | | | |
|---|---|---|---|
| 2013/0105726 A1* | 5/2013 | Tsuji | C08K 5/5419 252/75 |
| 2015/0001439 A1* | 1/2015 | Tsuji | C09K 5/14 252/75 |
| 2015/0148273 A1* | 5/2015 | Matsumoto | C08K 5/56 508/139 |
| 2015/0357261 A1* | 12/2015 | Tsuji | C08K 3/08 257/712 |
| 2016/0060462 A1* | 3/2016 | Kitazawa | C08L 83/04 252/75 |
| 2016/0208156 A1* | 7/2016 | Kitazawa | C08L 83/04 |
| 2018/0022977 A1* | 1/2018 | Tsuji | C08L 83/04 252/74 |

FOREIGN PATENT DOCUMENTS

| | | | | |
|---|---|---|---|---|
| JP | 2010-24420 | A | 2/2010 | |
| JP | 4915725 | B2 | 4/2012 | |
| JP | 5177755 | B2 | 4/2013 | |
| JP | 5834059 | B2 | 12/2015 | |
| WO | WO-2014188667 | A1 * | 11/2014 | C08L 83/04 |

* cited by examiner

SILICONE COMPOSITION AND CURED PRODUCT

CROSS-REFERENCE TO RELATED APPLICATION

This non-provisional application claims priority under 35 U.S.C. § 119(a) on Patent Application No. 2016-254833 filed in Japan on Dec. 28, 2016, the entire contents of which are hereby incorporated by reference.

TECHNICAL FIELD

This invention relates to a silicone composition and a cured product thereof.

BACKGROUND ART

A dilatant fluid is a mixture of liquid and particles and behaves as a fluid under slow deformation and as a solid in response to rapid deformation. This nature is utilized in a variety of industrial fields (see Patent Documents 1 to 4).

Recently, the dilatant fluid is used for protecting a fuel cell stack mounted inside fuel cell vehicles (see Patent Document 5). In the fuel cell stack, the dilatant fluid conforms to slow deformation as in the case of cell deflection, to prevent the cells from being further deformed or damaged. On the other hand, when large deformation is applied as in the case of a minor collision, the dilatant fluid behaves as a solid to prevent misalignment of the cell stack. However, the fuel cell stack of Patent Document 5 has the problem that since the dilatant fluid is received in a bag, the dilatant fluid leaks out upon breakage of the bag.

If a solid material like rubber exerts dilatant properties, the problem of Patent Document 5 would be overcome. However, the prior art crosslinked rubber does not always exhibit a high storage elastic modulus at a high strain rate. In order to increase the storage elastic modulus at a high strain rate, the amount of a filler added must be increased. A heavy loading of the filler, however, causes a viscosity buildup to the composition prior to curing, making the composition difficult to handle.

CITATION LIST

Patent Document 1: JP 3867898
Patent Document 2: JP 4915725
Patent Document 3: JP 5177755
Patent Document 4: JP-A 2010-024420
Patent Document 5: JP 5834059 (U.S. Pat. No. 9,520,612, EP 3062378)

SUMMARY OF INVENTION

An object of the invention is to provide a silicone composition which has a low viscosity and good moldability prior to curing and cures into a dilatant product that exhibits a low storage elastic modulus at a low strain rate and a high storage elastic modulus at a high strain rate; and a cured product of the composition.

The inventors have found that when an organopolysiloxane component capped at one end with an alkoxysilyl group, a linear organohydrogenpolysiloxane component having Si—H groups on side chains, and a linear organohydrogenpolysiloxane component having Si—H groups at both ends are used in a filled addition-curable silicone composition, the resulting silicone composition has a low viscosity, despite the filler loading, and ease of handling prior to curing, and cures into a cured product that exhibits a low storage elastic modulus when the strain rate is in a low-frequency range (i.e., 0.1 Hz) and a high storage elastic modulus when the strain rate is in a high-frequency range (i.e., 500 Hz).

In one aspect, the invention provides a silicone composition comprising:
(A) 100 parts by weight of an organopolysiloxane containing at least one silicon-bonded alkenyl group in the molecule and having a viscosity of 1.0 to 100 Pa·s at 25° C.,
(B) 1 to 100 parts by weight of an organopolysiloxane having the general formula (1):

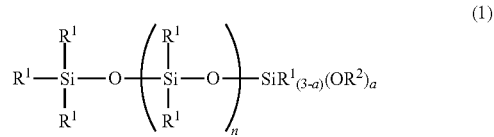

wherein $R^1$ is each independently a $C_1$-$C_{10}$ monovalent hydrocarbon group, $R^2$ is each independently an alkyl, alkoxyalkyl, alkenyl or acyl group, n is an integer of 2 to 100, and a is an integer of 1 to 3,
(C) an organohydrogenpolysiloxane having the general formula (2):

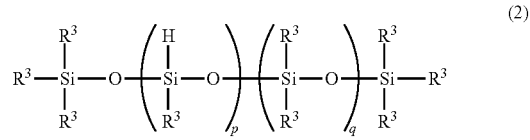

wherein p and q each are a positive integer, $10 \leq p+q \leq 100$, $0.01 \leq p/(p+q) \leq 0.5$, and $R^3$ is each independently a $C_1$-$C_6$ alkyl group,
(D) an organohydrogenpolysiloxane having the general formula (3):

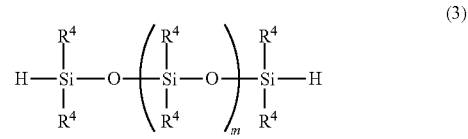

wherein $R^4$ is each independently a $C_1$-$C_6$ alkyl group and m is an integer of 5 to 1,000, components (C) and (D) being combined in such amounts that a ratio of {total number of SiH groups in components (C) and (D)}/{total number of alkenyl groups in components (A) and (B)} ranges from 0.6 to 1.5 and a ratio of {number of SiH groups in component (D)}/{number of SiH groups in component (C)} ranges from 1 to 10,
(E) 200 to 1,000 parts by weight of a filler having an average particle size of 0.1 to 20 μm,
(F) 0.01 to 1.0 part by weight of a platinum group metal catalyst, and
(G) 0.01 to 1.0 part by weight of a reaction inhibitor.

Also contemplated herein is a cured product of the silicone composition.

ADVANTAGEOUS EFFECTS OF INVENTION

The silicone composition of the invention has a low viscosity and good moldability prior to curing, does not leak out after curing, and affords a cured product which exhibits a low storage elastic modulus at a low strain rate and a high storage elastic modulus at a high strain rate.

DESCRIPTION OF PREFERRED EMBODIMENTS

As used herein, the notation (Cn-Cm) means a group containing from n to m carbon atoms per group. The abbreviation ppm stands for parts by weight per million parts by weight.

The silicone composition is defined as comprising components (A) to (G), which are described below in detail.

Component (A)

Component (A) is an organopolysiloxane containing at least one silicon-bonded alkenyl group in the molecule and having a viscosity at 25° C. of 1.0 to 100 Pa·s, preferably 2.0 to 10 Pa·s.

If the viscosity is less than 1.0 Pa·s, the composition becomes less dilatant. If the viscosity exceeds 100 Pa·s, the composition becomes less flowing. It is noted that the viscosity is measured by a rotational viscometer (the same applies hereinafter).

Any well-known organopolysiloxanes may be used as component (A) insofar as they have the viscosity and alkenyl content defined above. The structure of the organopolysiloxane is not particularly limited, and it may be linear or branched. Component (A) may be a mixture of two or more organopolysiloxanes having different viscosities.

The silicon-bonded alkenyl group has 2 to 10 carbon atoms, preferably 2 to 8 carbon atoms. Examples include vinyl, allyl, 1-butenyl, and 1-hexenyl. Of these, vinyl is preferred for ease of synthesis and cost. The ulkenyl group may be present at the end of the molecular chain and/or at a position midway the molecular chain of the organopolysiloxane. It is preferred for flexibility that the alkenyl groups be attached to only the both ends of the molecular chain.

Besides the alkenyl group, the organopolysiloxane (A) contains silicon-bonded organic groups, which include monovalent hydrocarbon groups of 1 to 20 carbon atoms, preferably 1 to 10 carbon atoms. Examples of the monovalent hydrocarbon group include alkyl groups such as methyl, ethyl, n-propyl, n-butyl, n-hexyl, and n-dodecyl; aryl groups such as phenyl; aralkyl groups such as 2-phenylethyl and 2-phenylpropyl; and halogenated forms of the foregoing groups in which some or all hydrogen atoms are substituted by halogen atoms (e.g., chlorine, fluorine and bromine), such as fluoromethyl, bromoethyl, chloromethyl and 3,3,3-trifluoropropyl. It is preferred for ease of synthesis and cost that at least 90 mol % of the organic groups be methyl.

Understandably, component (A) is preferably an organopolysiloxane capped at both ends with dimethylvinylsilyl, more preferably a dimethylpolysiloxane capped at both ends with dimethylvinylsilyl.

Component (B)

Component (B), which plays the role of decreasing the viscosity of the composition to impart fluidity thereto, is an organopolysiloxane having the general formula (1).

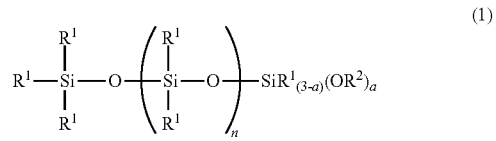

In formula (1), $R^1$ is each independently a substituted or unsubstituted monovalent hydrocarbon group of 1 to 10 carbon atoms, preferably 1 to 6 carbon atoms, and more preferably 1 to 3 carbon atoms. Examples include linear, branched and cyclic alkyl, alkenyl, aryl, aralkyl, haloalkyl and cyanoalkyl groups. Suitable linear alkyl groups include methyl, ethyl, n-propyl, n-hexyl, and n-octyl. Suitable branched alkyl groups include isopropyl, isobutyl, tert-butyl, and 2-ethylhexyl. Suitable cyclic alkyl groups include cyclopentyl and cyclohexyl. Suitable alkenyl groups include vinyl and allyl. Suitable aryl groups include phenyl and tolyl. Suitable aralkyl groups include 2-phenylethyl and 2-methyl-2-phenylethyl. Suitable haloalkyl groups include 3,3,3-trifluoropropyl, 2-(nonafluorobutyl)ethyl, and 2-(heptadecafluorooctyl)ethyl. Typical of the cyanoalkyl group is cyanoethyl. Of these, methyl, phenyl and vinyl are preferred as $R^1$.

$R^2$ is each independently an alkyl, alkoxyalkyl, alkenyl or acyl group. Although the carbon count is not particularly limited, these groups preferably have 1 to 10 carbon atoms, more preferably 1 to 6 carbon atoms, and even more preferably 1 to 3 carbon atoms. Suitable alkyl groups include linear, branched and cyclic alkyl groups as exemplified above for $R^1$. Suitable alkoxyalkyl groups include methoxyethyl and methoxypropyl. Suitable alkenyl groups are as exemplified above for $R^1$. Suitable acyl groups include acetyl and octanoyl. Of these, alkyl groups are preferred as $R^2$, with methyl and ethyl being more preferred.

The subscript n is an integer of 2 to 100, preferably 5 to 80, and a is an integer of 1 to 3, preferably equal to 3.

The viscosity at 25° C. of component (B), though not particularly limited, is preferably 0.005 to 10 Pa·s, more preferably 0.005 to 1 Pa·s. If the viscosity is less than 0.005 Pa·s, the composition may be liable to oil bleeding and lead to a reduction of adhesion with time. If the viscosity exceeds 10 Pa·s, the composition may become too viscous to flow.

Preferred examples of component (B) include organopolysiloxanes having the following formulae, but are not limited thereto.

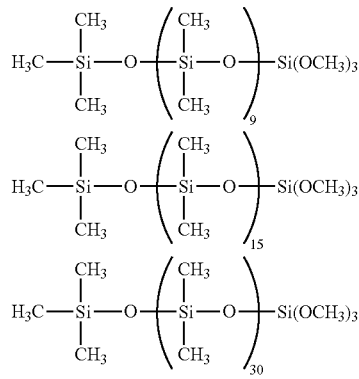

-continued

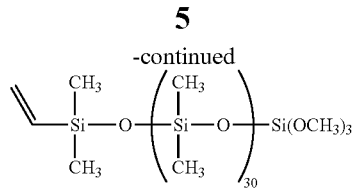

Component (B) may be used alone or in admixture of two or more. Component (B) is blended in an amount of 1 to 100 parts by weight, preferably 1 to 50 parts by weight per 100 parts by weight of component (A). If the amount of component (B) is less than 1 part by weight, the composition has too high a viscosity. If the amount of component (B) exceeds 100 parts by weight, the composition is difficult to cure.

Component (C)

Component (C), which plays the role of curing the liquid composition, is an organohydrogenpolysiloxane having the general formula (2).

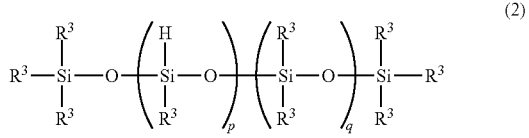

In formula (2), p and q are positive integers, and p+q is an integer of 10 to 100, preferably 20 to 60. If p+q is less than 10, the organohydrogenpolysiloxane may become volatile, causing contact and other failures when used with electronic parts. If p+q exceeds 100, the organohydrogenpolysiloxane may have too high a viscosity and be difficult to handle. The value of p/(p+q) is in a range of 0.01 to 0.5, preferably in a range of 0.05 to 0.4. If the value is less than 0.01, the composition may not form a network structure through crosslinking. If the value exceeds 0.5, many Si—H groups remain unreacted after initial cure, allowing excessive crosslinking reaction to take place over time in the presence of moisture so that the composition loses flexibility.

$R^3$ is each independently a $C_1$-$C_6$ alkyl group, which may have a linear, branched or cyclic structure. Suitable alkyl groups include methyl, ethyl, n-propyl, n-butyl, n-pentyl, and n-hexyl. It is preferred for ease of synthesis and cost that at least 90 mol % of $R^3$ be methyl.

Preferred examples of component (C) include organohydrogenpolysiloxanes having the following formulae, but are not limited thereto.

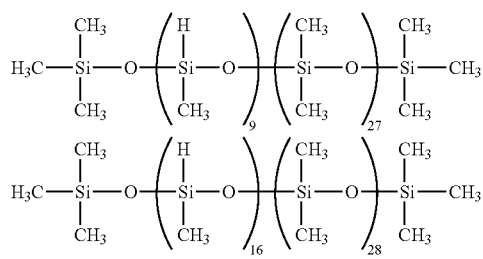

Component (C) may be used alone or in admixture of two or more.

Component (D)

Component (D), which plays the role of maintaining the cured composition at a low hardness and enhancing dilatant properties, is an organohydrogenpolysiloxane having the general formula (3).

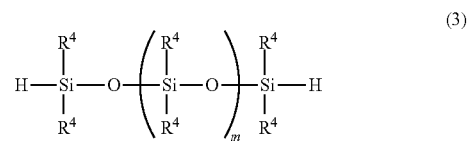

In formula (3), $R^4$ is each independently a $C_1$-$C_6$ alkyl group. The alkyl group may be as exemplified above for $R^3$. It is also preferred for ease of synthesis and cost that at least 90 mol % of $R^4$ be methyl. The subscript m is an integer of 5 to 1,000, preferably 10 to 100. If m is less than 5, the organohydrogenpolysiloxane may become volatile, causing contact and other failures when used with electronic parts. If m exceeds 1,000, the organohydrogenpolysiloxane may have too high a viscosity and be difficult to handle.

Preferred examples of component (D) include organohydrogenpolysiloxanes having the following formulae, but are not limited thereto.

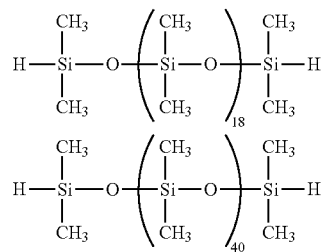

Component (D) may be used alone or in admixture of two or more.

Components (C) and (D) are combined in such amounts that a ratio of the total number of SiH groups in components (C) and (D) to the total number of alkenyl groups in components (A) and (B), that is, {total number of SiH groups in components (C) and (D)}/{total number of alkenyl groups in components (A) and (B)} ranges from 0.6 to 1.5, preferably from 0.7 to 1.4. If the ratio of the total number of SiH groups to the total number of alkenyl groups is less than 0.6, the cured composition forms an insufficient network structure, failing to provide the desired hardness after curing. If the ratio exceeds 1.5, the cured composition has too high a hardness.

Moreover, components (C) and (D) are combined in such amounts that a ratio of {number of SiH groups in component (D)}/{number of SiH groups in component (C)} ranges from 1 to 10, preferably from 2 to 9. If the ratio of the number of SiH groups in component (D) to the number of SiH groups in component (C) is less than 1, the composition becomes less dilatant. If the ratio exceeds 10, the composition becomes less curable.

Component (E)

Component (E) is a filler which plays the role of imparting dilatant properties to the (cured) composition.

Any of well-known fillers may be used, for example, aluminum powder, copper powder, silver powder, nickel powder, gold powder, alumina powder, zinc oxide powder, magnesium oxide powder, aluminum nitride powder, boron nitride powder, silicon nitride powder, diamond powder, carbon powder, indium, and gallium. The filler may be used alone or in admixture of two or more.

The filler should have an average particle size of 0.1 to 20 µm, preferably 0.5 to 15 µm. Particles with an average particle size of less than 0.1 µm are likely to agglomerate, adversely affecting fluidity. With an average particle size in excess of 20 µm, the composition may lose dilatant properties. The shape of the filler is preferably spherical, though not limited thereto. Notably, the average particle size is determined as a volume average particle size $D_{50}$ (a particle size at cumulative 50% by volume or median diameter) in particle size distribution measurement by laser light diffractometry.

Component (E) is blended in an amount of 200 to 1,000 parts by weight, preferably 300 to 800 parts by weight per 100 parts by weight of component (A). Less than 200 parts by weight of component (E) fails to impart the desired dilatant properties to the cured composition. With more than 1,000 parts by weight of component (E), the composition does not become liquid and has poor fluidity.

Component (F)

Component (F) is a platinum group metal catalyst. The platinum group metal catalyst may be selected from any well-known ones as long as it promotes addition reaction between alkenyl groups in component (A) and SiH groups in components (C) and (D).

Examples of the catalyst include platinum group metals alone such as platinum (including platinum black), rhodium and palladium; platinum chlorides, chloroplatinic acids and chloroplatinates such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$, wherein n is an integer of 0 to 6, preferably 0 or 6; alcohol-modified chloroplatinic acids; chloroplatinic acid-olefin complexes; supported catalysts comprising platinum group metals such as platinum black and palladium on supports of alumina, silica, and carbon; rhodium-olefin complexes; chlorotris(triphenylphosphine)rhodium (known as Wilkinson's catalyst); and complexes of platinum chlorides, chloroplatinic acids and chloroplatinates with vinyl-containing siloxanes. The platinum group metal catalyst may be used alone or in admixture of two or more. Of these, platinum or platinum compounds are preferred.

Component (F) may be used in a catalytic amount, that is, an amount sufficient to promote reaction of component (A) and the like with components (C) and (D), which may be determined as appropriate depending on the desired cure rate. Specifically, the amount of component (F) is 0.1 to 7,000 ppm, preferably 1 to 6,000 ppm of platinum group metal based on the weight of component (A). If the amount of component (F) is less than 0.1 ppm, the catalytic effect may not be exerted. If the amount exceeds 7,000 ppm, no further improvements in cure rate may be expected.

Component (G)

Component (G) is a reaction inhibitor. The reaction inhibitor is blended to suppress the progress of curing reaction at room temperature for thereby prolonging the shelf life and pot life of the composition. The reaction inhibitor may be selected from well-known ones as long as it suppresses the catalytic activity of component (F).

Examples of the reaction inhibitor include hydroxyl-containing acetylene compounds such as 1-ethynyl-1-cyclohexanol and 3-butyn-1-ol, various nitrogen compounds, organic phosphorus compounds, oxime compounds, and organic chlorine compounds. Of these, hydroxyl-containing acetylene compounds are preferred because they are non-corrosive to metals.

The reaction inhibitor may be diluted with an organic solvent such as toluene, xylene or isopropyl alcohol prior to use, in order to facilitate its dispersion in the silicone resin.

Component (G) is blended in an amount of 0.01 to 1.0 part by weight, preferably 0.05 to 0.9 part by weight per 100 parts by weight of component (A). Less than 0.01 part by weight of component (G) may fail to gain a satisfactory shelf life or pot life whereas more than 1.0 part by weight may render the composition less curable.

Other Components

Besides components (A) to (G), any well-known additives may be added to the composition as long as the objects of the invention are not impaired. Suitable additives include, for example, hindered phenol-based antioxidants, reinforcing or non-reinforcing fillers such as calcium carbonate, thixotropic agents such as polyethers, and colorants such as pigments and dyes.

The method of preparing the inventive silicone composition containing the above components is not particularly limited and may accord with any well-known techniques. The composition may be prepared by mixing the components (A) to (G) and optional other components in any desired order. Specifically, a one-pack type composition may be prepared by charging a planetary mixer with components (A), (B) and (E), which are mixed at a predetermined temperature (e.g., 25° C.) for a predetermined time (e.g., 1 hour) under reduced pressure. The mixture is cooled. Then components (G), (F), (C) and (D) are added thereto and mixed at a predetermined temperature (e.g., 25° C.) for a predetermined time (e.g., 1 hour).

Alternatively, the composition may be formulated as a two-pack type composition in any combination of the components as long as all components (A), (C), (D) and (F) do not coexist at the same time. For example, a two-pack type composition consisting of agents A and B may be prepared as follows. A gate mixer is charged with components (A), (B) and (E), which are mixed at a predetermined temperature (e.g., 25° C.) for a predetermined time (e.g., 1 hour) under reduced pressure. The mixture is cooled. Then component (F) is added thereto and mixed at a predetermined temperature (e.g., 25° C.) for a predetermined time (e.g., 30 minutes), yielding agent A. Separately, a gate mixer is charged with components (A), (B) and (E), which are mixed at a predetermined temperature (e.g., 25° C.) for a predetermined time (e.g., 1 hour) under reduced pressure. The mixture is cooled. Then component (G) is added thereto and mixed at a predetermined temperature (e.g., 25° C.) for a predetermined time (e.g., 30 minutes), and components (C) and (D) are added thereto and mixed at a predetermined temperature (e.g., 25° C.) for a predetermined time (e.g., 30 minutes), yielding agent B.

The silicone composition of one-pack type may be stored for a long term by refrigeration or freezing whereas the silicone composition of two-pack type may be stored for a long term at room temperature.

The viscosity at 25° C. of the silicone composition is not particularly limited, and preferably 1 to 400 Pa·s, more preferably 10 to 300 Pa·s. If the viscosity at 25° C. is less than 1 Pa·s, the filler may settle down. If the viscosity is more than 400 Pa·s, the composition may have too low a fluidity to mold.

A cured product obtained by curing the silicone composition defined above is also contemplated herein. The curing conditions are not particularly limited and may be similar to conditions used for well-known silicone gels. Specifically, the silicone composition, after casting to a part, may be allowed to cure naturally with the heat generated from the part or be cured by positive heating. In the latter case, the composition is cured by heating at preferably 60 to 180° C., more preferably 80 to 150° C. for preferably 0.1 to 3 hours, more preferably 0.5 to 2 hours.

The cured product of the silicone composition thus obtained preferably has a hardness of up to 50 as measured by a type A Durometer according to JIS K6253 because it typically shows a flexible behavior under slow deformation and minimizes the stress applied to the part in contact therewith.

The cured product preferably exhibits a storage elastic modulus of 8.1 to 100 MPa, more preferably 8.1 to 80 MPa when the strain rate is a high frequency (500 Hz). The cured product preferably exhibits a storage elastic modulus of 0.5 to 8.0 MPa, more preferably 1.0 to 7.0 MPa when the strain rate is a low frequency (0.1 Hz). A cured product having a storage elastic modulus within the above ranges exhibits good dilatant properties. Additionally, the ratio of (storage elastic modulus at a strain rate equal to a high frequency of 500 Hz)/(storage elastic modulus at a strain rate equal to a low frequency of 0.1 Hz) is preferably at least 3.0, more preferably at least 3.5.

EXAMPLE

Examples of the invention are given below by way of illustration and not by way of limitation. All parts are by weight (pbw).

The components used in Examples are shown below.

Component (A)

A-1: Dimethylpolysiloxane capped at both ends with dimethylvinylsilyl, having a viscosity of 5.0 Pa·s at 25° C.
A-2: Dimethylpolysiloxane capped at both ends with dimethylvinylsilyl, having a viscosity of 10.0 Pa·s at 25° C.
A-3 (for comparison):
Dimethylpolysiloxane capped at both ends with dimethylvinylsilyl, having a viscosity of 0.4 Pa·s at 25° C.

Component (B)

B-1: An organopolysiloxane of the following formula

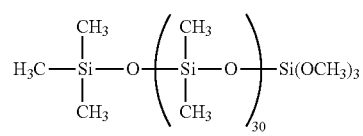

Component (C)

C-1: An organohydrogenpolysiloxane of the following formula

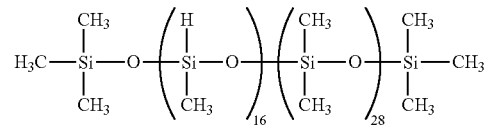

Component (D)

D-1: An organohydrogenpolysiloxane of the following formula

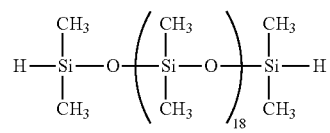

Component (E)

E-1: Spherical alumina powder having an average particle size of 4.0 μm and a specific surface area of 0.50 m²/g
E-2: Alumina powder having an average particle size of 12.0 μm and a specific surface area of 1.2 m²/g (AS-40 by Showa Denko K.K.)

Component (F)

F-1: Platinum-divinyltetramethyldisiloxane complex in the dimethylpolysiloxane A-1 (platinum content: 1 wt %)

Component (G)

G-1: 1-Ethynyl-1-cyclohexanol

Examples 1 to 4 and Comparative Examples 1 to 3

Preparation of Silicone Composition

A 5-L planetary mixer (Inoue Mfg. K.K.) was charged with components (A), (B) and (E), which were mixed at 25° C. for 2 hours under reduced pressure. Component (F) was added thereto and mixed at 25° C. for 30 minutes. Then component (G) was added thereto and mixed at 25°C. for 30 minutes until uniform. Finally components (C) and (D) were added thereto and mixed at 25° C. for 30 minutes until uniform, yielding a silicone composition. The amounts of components blended are shown in Table 1.

The silicone compositions thus obtained were measured and evaluated for the following physical properties. The results are also shown Table 1.

Viscosity

The absolute viscosity of the composition was measured at 25° C. by a rotational viscometer PC-1T (Malcom Co., Ltd.).

Hardness

The composition was press cured at 120° C. for 10 minutes and further heated in an oven at 120° C. for 50 minutes, obtaining a silicone sheet of 2.0 mm thick. Three silicone sheets were overlaid into a laminate, which was measured for hardness by type A Durometer according to JIS K6253.

Dilatant Properties

Analysis was made by using a viscoelasticity system Rheogel-E4000 (UBM Co., Ltd.) under conditions including method: dynamic viscoelasticity (sinusoidal) measurement, measurement mode: frequency dependency, chuck: tension, waveform: sine wave, and strain control: 25 μm. The sample was dimensioned 5.0 mm wide by 2.2 mm thick by 30 mm long. The storage elastic modulus was determined both when the strain rate was a high frequency (500 Hz) and when the strain rate was a low frequency (0.1 Hz), from which dilatant properties was evaluated.

TABLE 1

|  |  |  | Example | | | | Comparative Example | | |
|---|---|---|---|---|---|---|---|---|---|
|  |  |  | 1 | 2 | 3 | 4 | 1 | 2 | 3 |
| Amount (pbw) | Component (A) | A-1 | 100 | 100 | 50 | 100 | 100 | 100 | 0 |
|  |  | A-2 | 0 | 0 | 50 | 0 | 0 | 0 | 0 |
|  |  | A-3 | 0 | 0 | 0 | 0 | 0 | 0 | 100 |
|  | Component (B) | B-1 | 2.5 | 10 | 2.5 | 2.5 | 0 | 2.5 | 2.5 |
|  | Component (C) | C-1 | 0.3 | 0.3 | 0.3 | 0.3 | 0.3 | 1.2 | 1.7 |
|  | Component (D) | D-1 | 3.7 | 3.7 | 3.7 | 3.7 | 3.7 | 0 | 8.0 |
|  | Component (E) | E-1 | 600 | 700 | 600 | 0 | 700 | 600 | 600 |
|  |  | E-2 | 0 | 0 | 0 | 600 | 0 | 0 | 0 |
|  | Component (F) | F-1 | 0.05 | 0.05 | 0.05 | 0.05 | 0.05 | 0.05 | 0.05 |
|  | Component (G) | G-1 | 0.02 | 0.02 | 0.02 | 0.02 | 0.02 | 0.02 | 0.02 |
| Ratio of {number of SiH groups in components (C) and (D)}/{number of alkenyl groups in components (A) and (B)} |  |  | 1.08 | 1.08 | 1.15 | 1.08 | 1.08 | 1.09 | 1.06 |
| Ratio of {number of SiH groups in component (D)}/{number of SiH groups in component (C)} |  |  | 2.9 | 2.9 | 2.9 | 2.9 | 2.9 | 0 | 1.1 |
| Viscosity (Pa · s) |  |  | 210 | 185 | 287 | 154 | 906 | 221 | 14 |
| Hardness (Type A) |  |  | 16 | 5 | 32 | 15 | —* | 52 | 42 |
| Storage elastic modulus | E' (500 Hz) (MPa) |  | 13.2 | 9.56 | 18.8 | 8.6 | —* | 55.1 | 26.0 |
|  | E' (0.1 Hz) (MPa) |  | 1.72 | 1.04 | 4.8 | 1.19 | —* | 34.0 | 14.5 |
|  | E' (500 Hz)/E' (0.1 Hz) |  | 7.7 | 9.2 | 3.9 | 7.3 | —* | 1.6 | 1.8 |

*unmoldable

As seen from Table 1, the silicone compositions of Examples 1 to 4 had a low viscosity and good moldability. The cured products exhibited a relatively high storage elastic modulus in the range of 8.5 to 19.0 MPa when the strain rate was a high frequency (500 Hz) and a low storage elastic modulus in the range of 1.0 to 5.0 MPa when the strain rate was a low frequency (0.1 Hz), indicating that the cured products had good dilatant properties.

Japanese Patent Application No. 2016-254833 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A cured product of a silicone composition having a storage elastic modulus of 8.1 to 100 MPa when the strain rate is a high frequency of 500 Hz and a storage elastic modulus of 0.5 to 8.0 MPa when the strain rate is a low frequency of 0.1 Hz, wherein the silicone composition comprises:

(A) 100 parts by weight of an organopolysiloxane containing at least one silicon-bonded alkenyl group in the molecule and having a viscosity of 1.0 to 100 Pa·s at 25° C., (B) 1 to 100 parts by weight of an organopolysiloxane having the general formula (1):

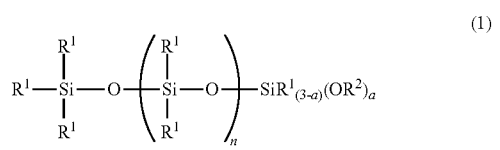

(1)

wherein $R^1$ is each independently a $C_1$-$C_{10}$ monovalent hydrocarbon group, $R^2$ is each independently an alkyl, alkoxyalkyl, alkenyl or acyl group, n is an integer of 2 to 100, and a is an integer of 1 to 3, (C) an organohydrogenpolysiloxane having the general formula (2):

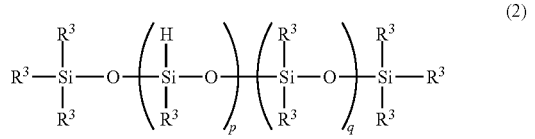

(2)

wherein p and q each are a positive integer, $10 \leq p+q \leq 100$, $0.01 \leq p/(p+q) \leq 0.5$, and $R^3$ is each independently a $C_1$-$C_6$ alkyl group, (D) an organohydrogenpolysiloxane having the general formula (3):

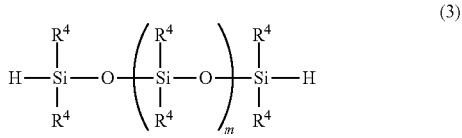

(3)

wherein $R^4$ is each independently a $C_1$-$C_6$ alkyl group and m is an integer of 5 to 1,000, components (C) and (D) being combined in such amounts that a ratio of {total number of SiH groups in components (C) and (D)}/{total number of alkenyl groups in components (A) and (B)} ranges from 0.6 to 1.5 and a ratio of {number of SiH groups in component (D)}/{number of SiH groups in component (C)} ranges from 1 to 10, (E) 200 to 800 parts by weight of a filler having an average particle size of 0.1 to 20 μm, (F) 0.01 to 1.0 part by weight of a platinum group metal catalyst, and (G) 0.01 to 1.0 part by weight of a reaction inhibitor, wherein the filler is at least one selected from the group consisting of copper powder, silver powder, nickel powder, gold powder, alumina powder, magnesium oxide powder, aluminum nitride powder, boron nitride powder, silicon nitride powder, diamond powder, carbon powder, indium, and gallium.

2. The cured product of claim 1, wherein a ratio of {storage elastic modulus at a strain rate equal to a high frequency of 500 Hz}/{storage elastic modulus at a strain rate equal to a low frequency of 0.1 Hz} is at least 3.0.

3. The cured product of claim 1, wherein the storage elastic modulus is in a range of 8.1 to 80 MPa when the strain rate is the high frequency of 500 Hz and the storage elastic modulus is in a range of 1.0 to 7.0 MPa when the strain rate is the low frequency of 0.1 Hz.

4. The cured product of claim 1, wherein a ratio of {storage elastic modulus at a strain rate equal to a high frequency of 500 Hz}/{storage elastic modulus at a strain rate equal to a low frequency of 0.1 Hz} is at least 3.5.

5. The cured product of claim 1, wherein the silicone composition comprises (E) 200 to 700 parts by weight of a filler having an average particle size of 0.1 to 20 μm.

6. The cured product of claim 1, wherein the silicone composition comprises (E) 200 to 600 parts by weight of a filler having an average particle size of 0.1 to 20 μm.

7. The cured product of claim 1 having a hardness of up to 50 as measured by a type A Durometer according to JIS K6253.

* * * * *